United States Patent [19]
Kitagawa et al.

[11] Patent Number: 5,723,826
[45] Date of Patent: Mar. 3, 1998

[54] LOAD CELL UNIT

[75] Inventors: Tohru Kitagawa, Mishima; Yoshihisa Nishiyama, Sunto-gun; Shuji Takabayashi, Mishima, all of Japan

[73] Assignee: Kabushiki Kaisha TEC, Shizuoka, Japan

[21] Appl. No.: 498,294

[22] Filed: Jul. 3, 1995

[30] Foreign Application Priority Data

Jul. 4, 1994 [JP] Japan .................... 6-151862

[51] Int. Cl.$^6$ .................... G01G 3/14; G01G 3/08
[52] U.S. Cl. .................... 177/211; 177/229
[58] Field of Search .................... 177/229, 211; 361/778, 816, 818

[56] References Cited

U.S. PATENT DOCUMENTS

| | | | |
|---|---|---|---|
| 3,867,759 | 2/1975 | Siefker | 29/628 |
| 4,146,291 | 3/1979 | Goff et al. | 339/111 |
| 5,353,201 | 10/1994 | Maeda | 361/816 |

FOREIGN PATENT DOCUMENTS 2 049 950  12/1980  United Kingdom .

OTHER PUBLICATIONS

JP 63-52026, Mar. 5, 1988 English Abstract.
JP 63-52025, Mar. 5, 1988 English Abstract.

*Primary Examiner*—Michael L. Gellner
*Assistant Examiner*—Michael J. Hayes
*Attorney, Agent, or Firm*—Oblon, Spivak, McClelland, Maier & Neustadt, P.C.

[57] ABSTRACT

A load cell unit in accordance with the present invention comprises a load cell and a wiring board. The load cell comprises a flexible member provided with a through hole formed between the fixed end and the moving end thereof so as to form four flexible portions, and strain gages attached to the flexible portions, respectively. The wiring board is provided with a circuit connected to the strain gages of the load cell so as to form a bridge circuit including the strain gages, and a processing circuit connected to the bridge circuit. The wiring board has a first major surface mounted with at least film capacitors among the circuit elements of the processing circuit, and a second major surface. A first shield cover is attached to the first major surface of the wiring board so as to cover the circuit elements mounted on the first major surface, and a second shield cover is attached to the second major surface of the wiring board so as to cover the circuit elements mounted on the second major surface of the wiring board. The wiring board is disposed beside the load cell with the first shield cover disposed in the through hole of the load cell. The wiring board of the load cell unit is shielded effectively and the load cell unit has a compact construction.

18 Claims, 6 Drawing Sheets

LOAD CELL UNIT

BACKGROUND OF THE INVENTION

1. Field of the Invention

The present invention relates to a load cell unit comprising a load cell having a flexible member provided at its flexible portions with strain gages, and a wiring board connected to the strain gages with lead wires.

2. Description of the Prior Art

A load cell balance capable of converting a weight of a weighing object into a corresponding electrical data has been practically used.

A conventional load cell balance will be described with reference to FIG. 5. The load cell balance 1 comprises a base 10, a load cell 9 having a fixed end 3 fixed to the base 10 and a moving end 4, a pan 11 supported by a support frame, not shown, on the moving end 4 of the load cell 9, and a wiring board 14 fixedly held on the load cell 9.

The load cell 9 has a flexible member 6 formed by a pair of beams 5 extended between the fixed end 3 and the moving end 4. The flexible member 6 is formed by forming a through hole 2 in a metal block so as to form four flexible portions 7 in the beams 5. Four strain gages 8 are attached to the four flexible portions 7 of the flexible member 6, respectively, to form the load cell 9.

The wiring board 14 is fastened through spacers 12 with bolts 13 to the side surface of the fixed end 3 of the load cell 9 to form a a load cell unit 18. The strain gages 8 of the load cell 9 are connected to the terminals 15 of the wiring board 14 with lead wires 16. The strain gage 8, the lead wires 16 and printed wiring lines of the wiring board 14 form a bridge circuit. The bridge circuit is connected to an A/D converter. The A/D converter has film capacitors 17 mounted on the wiring board 14. The A/D converter is provided in a processing circuit. The processing circuit also includes an amplifier and a low pass filter.

When a weighing object, not shown, to be weighed is put on the pan 11, the four flexible portions 7 of the load cell 9 are strained according to the weight of the weighing object and, consequently, the four strain gages 8 are strained and their resistances change accordingly, and the analog output signal of the bridge circuit including the strain gage 8 changes accordingly. The A/D converter mounted on the wiring board 14 converts the analog output signal of the bridge circuit into a corresponding digital signal, and then an arithmetic circuit, such as a CPU (central processing unit), not shown, processes the digital output signal of the A/D converter to calculate the weight of the weighing object electrically. When thus measuring the weight of the weighing object, the film capacitors 17 improve the A/D conversion characteristic of the A/D converter mounted on the wiring board 14.

Sometimes, external disturbing radiowaves cause the A/D converter to generate noise. In some load cell balance, the load cell unit 18 is shielded by a shield box from external disturbances to prevent the generation of noise by the A/D converter. However, the shield box makes it difficult to miniaturize the load cell unit 18 and to reduce the weight of the same. Although the film capacitors 17 improve the A/D conversion characteristic of the A/D converter, the film capacitors 17, which are comparatively large circuit elements, protrude greatly from the surface of the wiring board 14. Therefore, the load cell unit 18 becomes very large when the load cell unit 18 including the wiring board 14 is shielded by a shield box.

A load cell unit 19 proposed by the applicant of the present patent application to solve those problems and disclosed in Japanese Patent Laid-open (Kokai) No. 63-52025 will be described with reference to FIG. 6. This load cell unit 19 has circuit unit 21 formed by containing a wiring board 14 mounted with film capacitors 17 in a shield box 20. The circuit unit 21 is supported in the through hole 2 of a load cell 9 by a support plate 22. A plurality of lead-through capacitors 24 are fitted in a plurality of through holes 23 formed in the shield box 20, and the wiring board 14 and a FPC (flexible printed circuit) 26 are connected by lead wires 25 extended through the lead-through capacitors 24.

Since the wiring board 14 of the load cell unit 19 is shielded by the shield box 20, the A/D converter is not disturbed by external disturbing radiowaves. Since the wiring board 14 provided with the comparatively large film capacitors 17 is disposed in the through hole 2 of the load cell 9, the size of the load cell unit 19 is not increased by the film capacitors 17.

However, since the shield box 20 is necessarily larger than the wiring board 14, and the load cell 9 is larger than the shield box 20, the effect of this proposal in miniaturizing the load cell unit 19 is not very significant.

SUMMARY OF THE INVENTION

Accordingly, it is an object of the present invention to provide a miniaturized load cell unit provided with an effectively shielded wiring board.

Another object of the present invention is to provide a load cell unit provided with an effectively shielded wiring board and which is easy to fabricate.

A further object of the present invention is to provide a load cell unit provided with an effectively shielded wiring board and which is easy to assemble.

A load cell unit in accordance with the present invention comprises a load cell, a wiring board, a first shield cover and a second shield cover. The load cell comprises a flexible member provided with a through hole formed between the fixed end and the moving end thereof so as to form four flexible portions, and strain gages attached to the flexible portions, respectively. The wiring board has a circuit connected to the strain gages of the load cell so as to form a bridge circuit including the strain gates, and a processing circuit connected to the bridge circuit. The wiring board has a first major surface and a second major surface, at least film capacitors among the circuit elements of the processing circuit are mounted on the first major surface, and the wiring board is disposed on one side of the load cell with the film capacitors disposed in the through hole of the load cell. The first shield cover is attached to the first major surface of the wiring board so as to cover the circuit elements mounted on the first major surface without interfering with the load cell, and the second shield cover is attached to the second major surface of the wiring board so as to cover the second major surface. Accordingly, the comparatively thin wiring board shielded by the first and the second shield cover is disposed along the load cell with the greatly protruding film capacitors disposed in the through hole formed in the flexible member. Consequently, the load cell unit can be formed in a very small structure.

A load cell unit in another aspect of the present invention comprises a load cell and a circuit unit. The load cell comprises a flexible member provided with a through hole formed between the fixed end and the moving end thereof so as to form four flexible portions, and strain gages attached

3 to the flexible portions, respectively. The circuit unit comprises a wiring board provided with a circuit connected to the strain gages of the load cell so as to form a bridge circuit including the strain gages, and a processing circuit connected to the bridge circuit, and having a first major surface mounted with at least film capacitors among the circuit elements of the processing circuit, a first shield cover attached to the first major surface of the wiring board so as to cover the circuit elements mounted on the first major surface, and a second shield cover attached to the second major surface of the wiring board so as to cover the circuit elements mounted on the second major surface of the wiring board adverse to the first major surface. The circuit unit is disposed beside the load cell with the first shield cover disposed in the through hole of the load cell. Accordingly, the comparatively thin wiring board shielded by the first and the second shield cover is disposed along the load cell with the greatly protruding film capacitors disposed in the through hole formed in the flexible member. Consequently, the load cell unit can be formed in a very compact structure.

DETAILED DESCRIPTION OF THE PREFERRED EMBODIMENT

Figure 1:
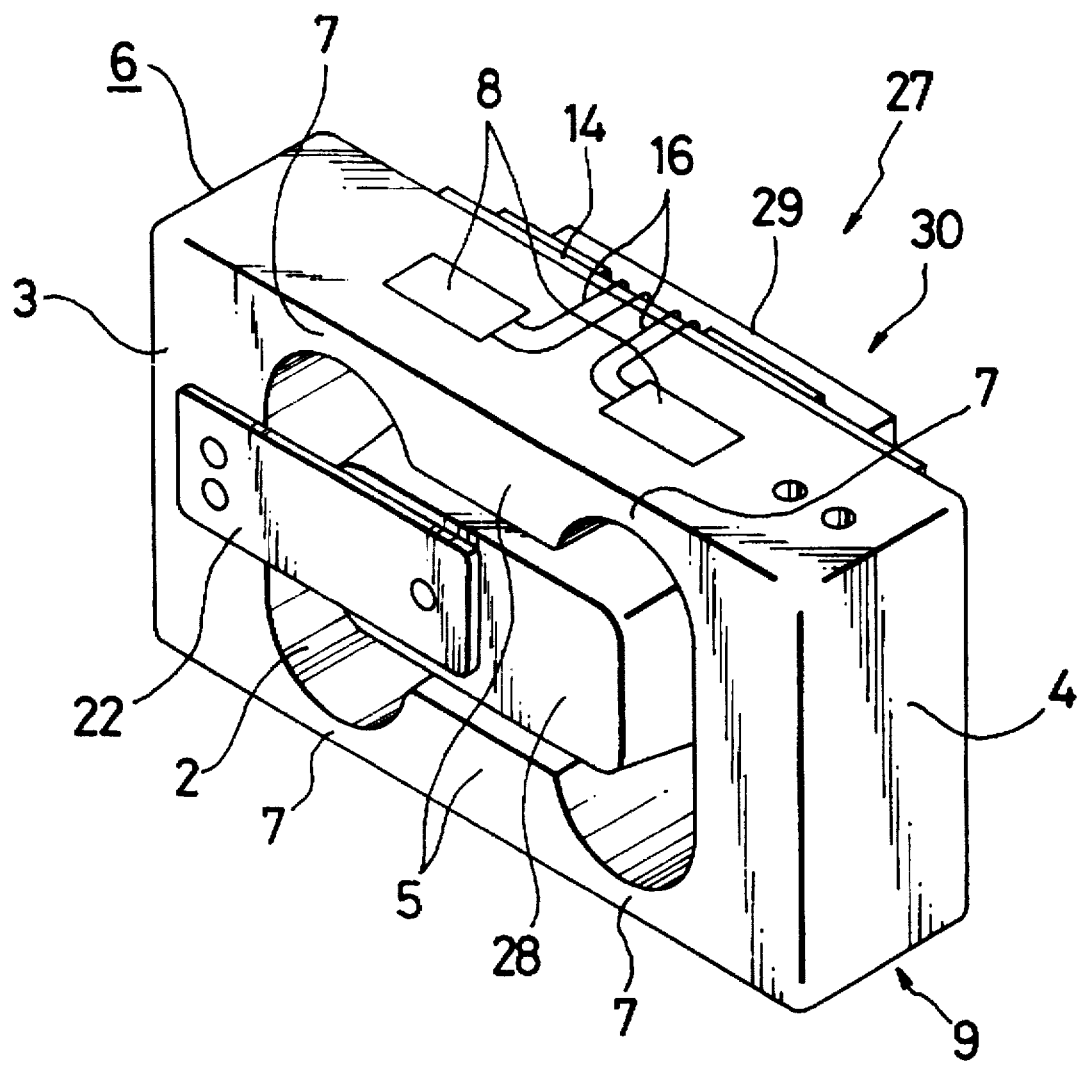
FIG. 1 is a perspective view of a load cell unit in a preferred embodiment according to the present invention.

A preferred embodiment of the present invention will be described with reference to FIGS. 1 to 4, in which parts like or corresponding to those of the previously described first load cell unit 18 and the second conventional load cell unit 19 are designated by the same designations and reference characters and the description thereof will be omitted.

Figure 2:
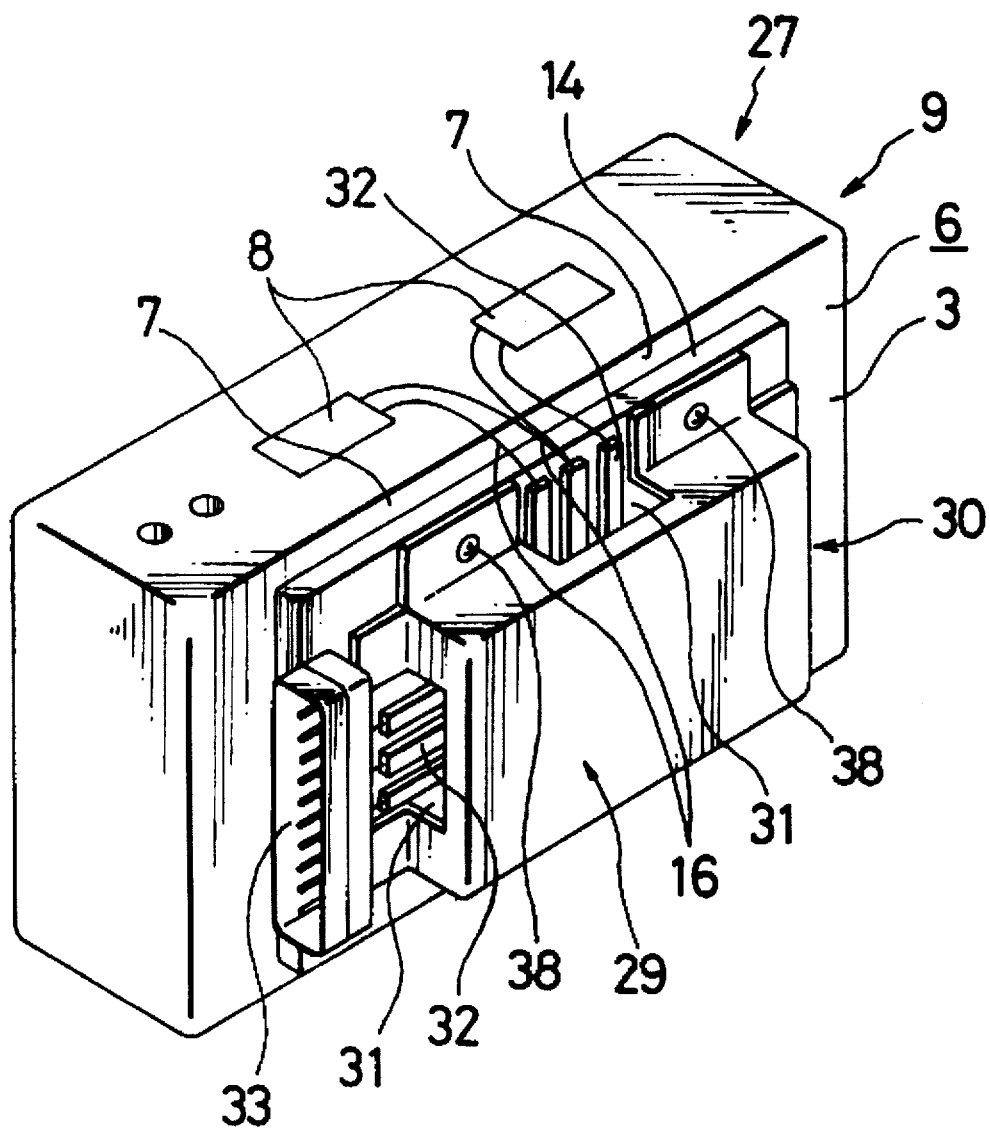
FIG. 2 is a perspective view of the load cell unit of FIG. 1, as viewed from a different direction.

A load cell unit 27 has a wiring board 14, and film capacitors 17 among the circuit elements of an A/D converter, i.e., a processing circuit, are mounted on the first major surface of the wiring board 14. A first shield cover 28 and a second shield cover 29 are attached to the first major surface and the second major surface of the wiring board 14, respectively, to form a circuit unit 30. As shown in FIGS. 1 and 2, the first shield cover 28 is supported on a load cell 9 by a support plate 22 with the first shield cover 28 located in a through hole 2 formed in the load cell 9 so that the wiring board 14 is disposed beside the load cell 9.

Figure 4:
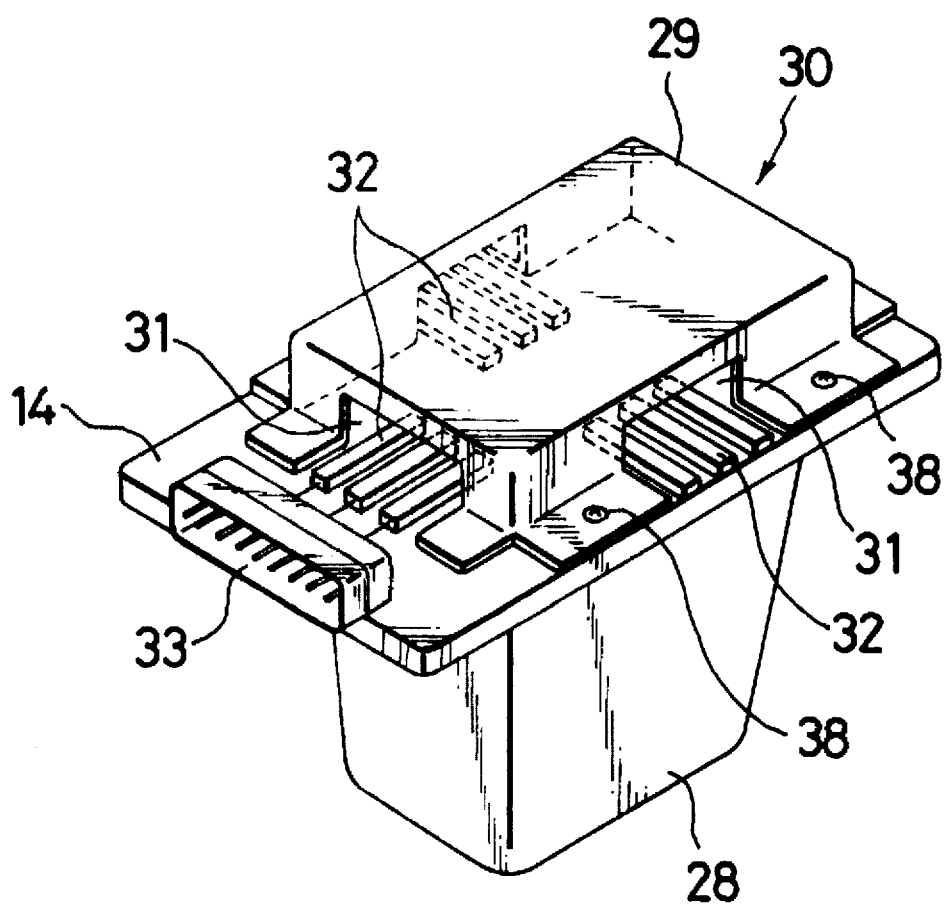
FIG. 4 is a perspective view of the circuit unit.
Figure 5:
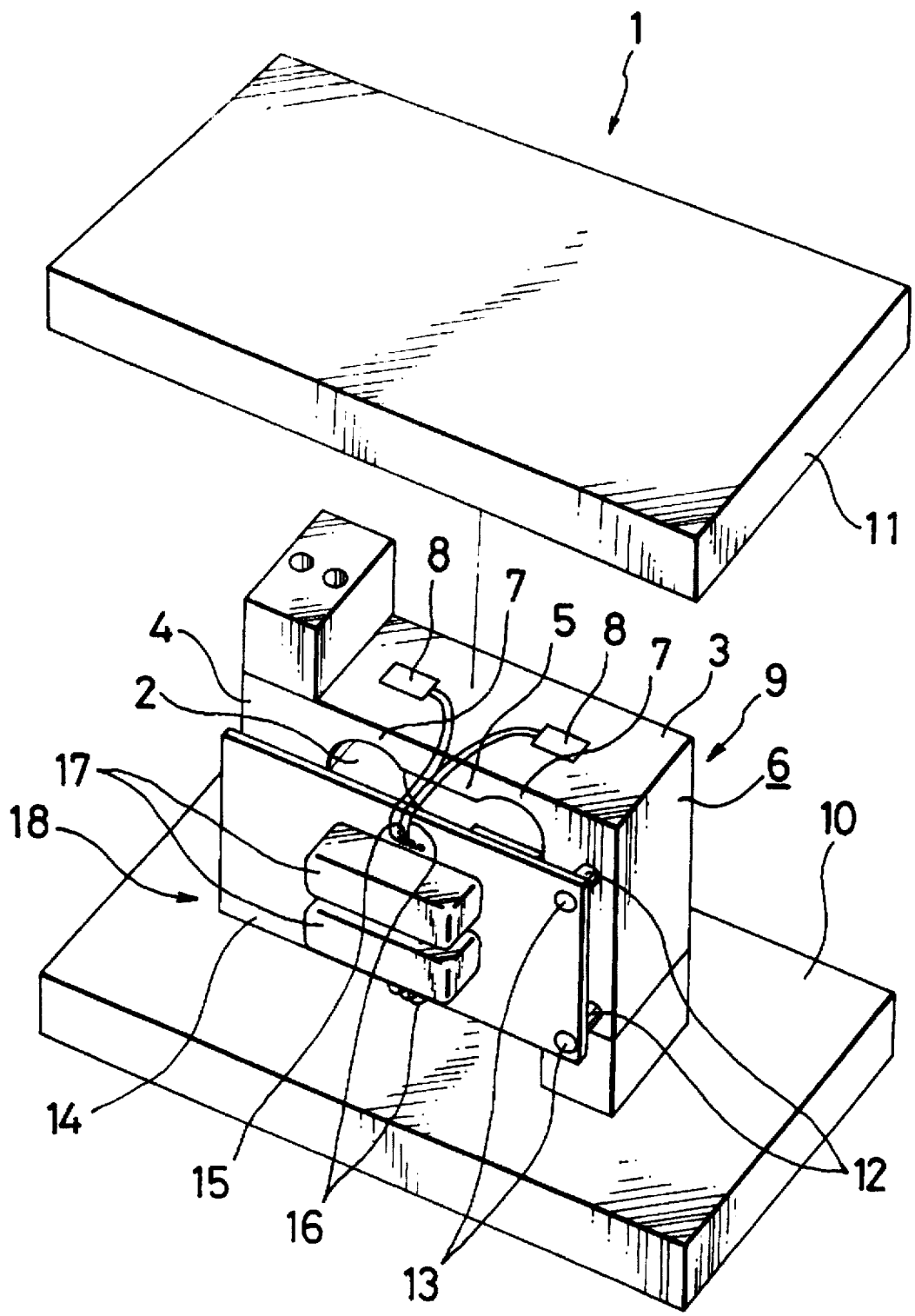
FIG. 5 is an exploded perspective view of a load cell balance employing a conventional load cell unit.
Figure 6:
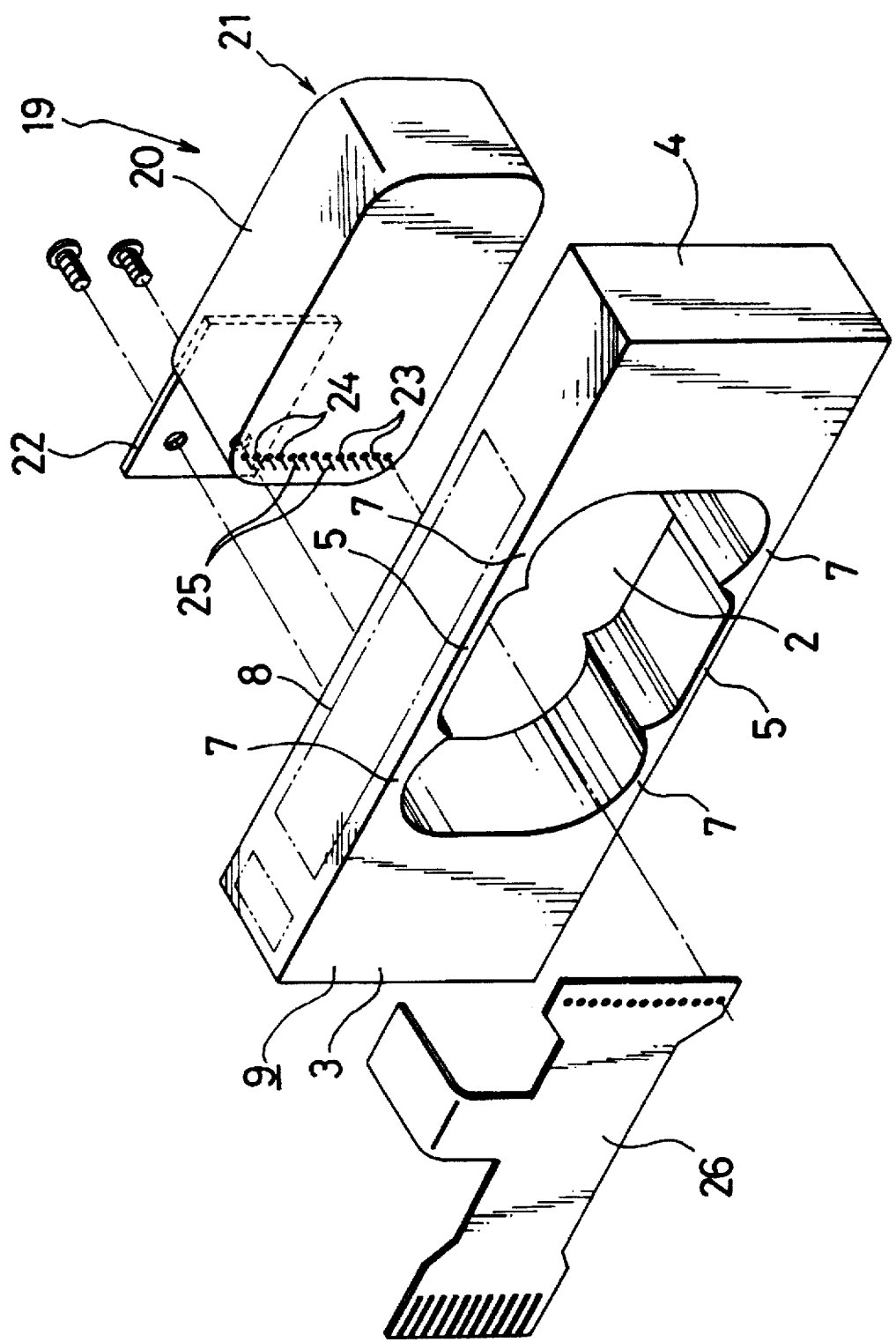
FIG. 6 is an exploded perspective view of another conventional load cell unit.

As shown in FIG. 4, the second shield cover 29 is provided with three openings 31 in its three side walls, and lead-through capacitors 32 are mounted on the second major surface of the wiring board 14 at positions corresponding to the openings 31, respectively. A connector 33 is attached to one end of the second major surface of the wiring board 14, and the connector 33 and the strain gages 8 of the load cell 9 are connected by lead wires 16 extended through the lead-through capacitors 32.

Figure 3A:
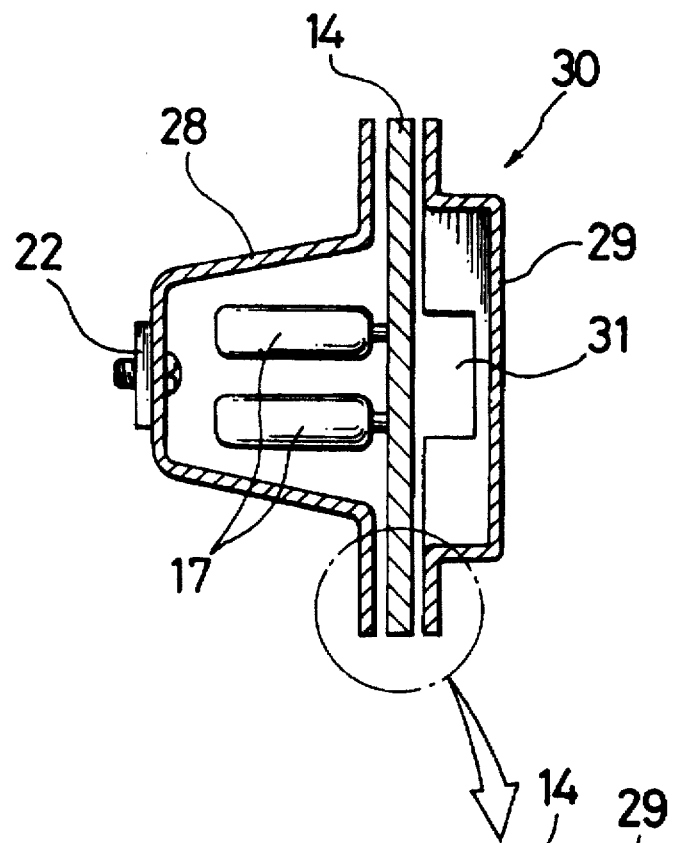
FIG. 3 is a longitudinal sectional view of a circuit unit.
Figure 3B:
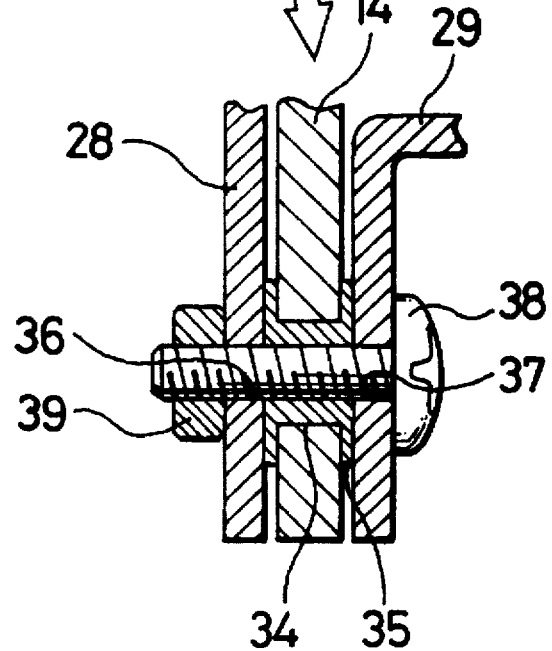

As shown in FIG. 3, the wiring board 14 is provided with a through hole 34. A ground line 35 formed on the first and the second major surfaces of the wiring board 14 is extended through the through hole 34. A bolt 38 is passed through a

4 through hole 36 formed in the first shield cover 28, the through hole 34 of the wiring board 14 and a through hole 37 formed in the second shield cover 29 in that order and a nut 39 is screwed on the bolt 38 to fasten the first shield cover 28, the wiring board 14 and the second shield cover 29 together and to connect the first shield cover 28 and the second shield cover 29 to the ground line 35. Since the ground line 35 is connected conductively to the load cell 9, the first shield cover 28 and the second shield cover 29 are grounded.

Although the ground line 35 is shown in a thickness equal to that of the wiring board 14 in FIG. 3 for simplicity, actually, the ground line 35 is a conductive thin film. Although only the three lead-through capacitors 32 are connected to the connector 33 in FIG. 4 for simplicity, actually, the number of the lead-through capacitors 32 to be mounted on the wiring board 14, as well as the number of the terminals of the connector 33, is dependent on the number of signals to be transmitted through the lead-through capacitors 32.

In a load cell balance, not shown, incorporating the load cell unit 27 thus constructed, the four flexible portions 7 of the load cell 9 are strained by the weight of a weighing object and hence the four strain gages 8 are strained accordingly and the resistances of the strain gages 8 change. Then, the analog output of the bridge circuit including the strain gages 8 is converted into a corresponding digital signal by the A/D converter of the wiring board 14, and the digital signal is processed to calculate the weight of the measuring object electrically.

In this load cell unit 27, the film capacitors 17 of the A/D converter, mounted on the wiring board 14 are shielded by the first shield cover 28 and the printed wiring of the wiring board 14 is shielded by the second shield cover 29 to prevent the generation of noise due to external disturbing radiowaves. Since the first shield cover 28 of the circuit unit 30 is disposed in the through hole 2 of the load cell 9 and the wiring board 14 is disposed beside the load cell 2, the load cell unit 27 can be formed in a comparatively compact structure.

Although the film capacitors 17 mounted on the wiring board 14 so as to protrude greatly from the wiring board 14 to form the A/D converter so that the A/D converter exerts satisfactory characteristics, the protruding film capacitors 17 do not increase the size of the load cell unit 27 because the first shield cover 28 covering the film capacitors 17 is disposed in the through hole 2 of the load cell 9.

Since the flat wiring board 14 having a large area and mounted with the film capacitors 17 is disposed beside and in parallel to the load cell 9 instead of being disposed in the through hole 2 of the wiring board 14, the load cell 9 need not be formed of a large size so as to contain the wiring board 14 in the through hole 2 and, consequently, the load cell unit 27 can be formed in a comparatively compact structure.

Since the shield covers 28 and 29 are connected to the ground earth line 35 extending through the through hole 34 of the wiring board 14, the shield covers 28 and 29 are electrically connected and grounded. Therefore, the A/D converter of the wiring board 14 can be surely shielded. Thus the circuit unit 30 has a simple configuration and can be easily assembled. The connection of the circuit unit 30 to the load cell 9 simply by connecting the first shield cover 28 of the circuit unit 30 by the support plate 22 to the load cell 9, and the disposition of the connector 33 with its connecting surface vertically extended facilitate the assembly of the circuit unit 30.

The arrangement of all the circuit elements on the first major surface of the wiring board 14 facilitates the fabrication of the load cell unit 27.

The preferred embodiment specifically described herein is illustrative and not limitative, and it is to be understood by those skilled in the art that changes and variations may be made therein and the present invention may be practiced otherwise than as specifically described herein without departing from the scope and spirit of thereof.

What is claimed is:

1. A load cell unit comprising:

a load cell comprising a flexible member having a fixed end, a moving end, and a through hole formed between the fixed end and the moving end so as to form four flexible portions, and strain gages attached to the flexible portions of the flexible member, respectively;

a wiring board provided with a circuit connected to the strain gages of the load cell so as to form a bridge circuit including the strain gages, a processing circuit connected to the bridge circuit, and having a first major surface and a second major surface, at least film capacitors among the circuit elements of the processing circuit being mounted on the first major surface, the wiring board having a size in all dimensions exceeding a size of the through hole of the load cell and being disposed beside the load cell with the film capacitor mounted on and protruding from the first major surface to be disposed in the through hole of the load cell;

a first shield cover attached to the first major surface of the wiring board so as to cover the circuit elements mounted on the first major surface of the wiring board and to protrude into the through hole and so as not to interfere with the load cell; and a second shield cover attached to the second major surface of the wiring board so as to cover the second major surface of the wiring board and to be formed external of the through hole.

2. A load cell unit as recited in claim 1, wherein all the circuit elements of the processing circuit are mounted on the first major surface of the wiring board.

3. A load cell unit as recited in claim 1, wherein the wiring board is supported on the load cell by a support plate attached to an extremity of the first shield cover.

4. A load cell unit as recited in claim 1, further comprising an electrically conductive member extended through a through hole formed in the wiring board and connecting the first and the second shield cover.

5. A load cell unit as recited in claim 4, wherein earth lines formed respectively on the first and the second major surface of the wiring board are connected electrically through the through hole of the wiring board.

6. A load cell unit as recited in claim 1, further comprising lead-through capacitors mounted on the wiring board, and lead wires extended through the lead-through capacitors and connected to the processing circuit.

7. A load cell unit as recited in claim 6, wherein the second shield cover is provided with recesses formed so as to define openings when the second shield cover is attached to the second major surface of the wiring board, and the lead-through capacitors are arranged at positions respectively corresponding to the openings.

8. A load cell unit as recited in claim 1, further comprising a connector mounted on the second surface of the wiring board and connected to the processing circuit by lead wires.

9. A load cell unit as recited in claim 8, wherein the connector is disposed with its connecting surface in a vertical position.

10. A load cell unit comprising:

a load cell comprising a flexible member having a fixed end, a moving end, and a through hole formed between the fixed end and the moving end so as to form four flexible portions, and strain gages attached to the flexible portions of the flexible member, respectively; and a circuit unit comprising a wiring board provided with a circuit connected to the strain gages of the load cell so as to form a bridge circuit including the strain gages, and a processing circuit connected to the bridge circuit, and having a first major surface and a second major surface, at least film capacitors among the circuit elements of the processing circuit being mounted on the first major surface, a first shield cover attached to the first major surface of the wiring board so as to cover the circuit elements mounted on the first major surface of the wiring board, and a second shield cover attached to the second major surface of the wiring board so as to cover the second major surface of the wiring board, the wiring board having a size in all dimensions exceeding a size of the through hole of the load cell and being disposed beside the load cell with the first shield cover disposed to protrude into the through hole of the load cell and the second shield cover formed external of the through hole of the load cell.

11. A load cell unit as recited in claim 10, wherein all the circuit elements of the processing circuit are mounted on the first major surface of the wiring board.

12. A load cell unit as recited in claim 10, wherein the wiring board is supported on the load cell by a support plate attached to an extremity of the first shield cover.

13. A load cell unit as recited in claim 10, further comprising an electrically conductive member extended through a through hole formed in the wiring board and connecting the first and the second shield cover.

14. A load cell unit as recited in claim 13, wherein earth lines formed respectively on the first and the second major surface of the wiring board are connected electrically through the through hole of the wiring board.

15. A load cell unit as recited in claim 10, further comprising lead-through capacitors mounted on the wiring board, and lead wires extended through the lead-through capacitors and connected to the processing circuit.

16. A load cell unit as recited in claim 15, wherein the second shield cover is provided with recesses formed so as to define openings when the second shield cover is attached to the second major surface of the wiring board, and the lead-through capacitors are arranged at positions respectively corresponding to the openings.

17. A load cell unit as recited in claim 10, further comprising a connector mounted on the second surface of the wiring board and connected to the processing circuit by lead wires.

18. A load cell unit as recited in claim 17, wherein the connector is disposed with its connecting surface in a vertical position.

* * * * *